United States Patent
Chardon et al.

(10) Patent No.: US 9,689,523 B2
(45) Date of Patent: Jun. 27, 2017

(54) FOLDABLE MOBILE ELECTRONIC DEVICE STAND

(71) Applicant: Logitech Europe SA, Lausanne (CH)

(72) Inventors: Jean-Michel Chardon, Vufflens-la-Ville (CH); Remy Zimmermann, Pully (CH); Yao Lu, Suzhou (CN); Liang Tang, Suzhou (CN)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/068,097

(22) Filed: Oct. 31, 2013

(65) Prior Publication Data
US 2014/0231614 A1 Aug. 21, 2014

Related U.S. Application Data

(60) Provisional application No. 61/765,644, filed on Feb. 15, 2013.

(30) Foreign Application Priority Data

Aug. 13, 2013 (CN) .......................... 2013 1 0351744

(51) Int. Cl.
*A47B 91/00* (2006.01)
*A47G 29/00* (2006.01)
(Continued)

(52) U.S. Cl.
CPC ............ *F16M 11/10* (2013.01); *F16M 13/00* (2013.01); *G06F 1/1616* (2013.01);
(Continued)

(58) Field of Classification Search
CPC ............... F16M 11/22; F16M 2200/08; F16M 11/2007; F16M 11/2042; F16M 11/00;
(Continued)

(56) References Cited

U.S. PATENT DOCUMENTS 1,859,646 A * 5/1932 Apfelbaum ..................... 40/603
3,095,668 A * 7/1963 Dorsett ........................... 446/92
(Continued)

FOREIGN PATENT DOCUMENTS

CN     202065633 U     12/2011

OTHER PUBLICATIONS

Requirement for Restriction/Election, dated Jan. 13, 2015, for U.S. Appl. No. 14/043,874, filed Oct. 2, 2013, 6 pages.
(Continued)

*Primary Examiner* — Brian Mattei
*Assistant Examiner* — Taylor Morris
(74) *Attorney, Agent, or Firm* — Kilpatrick Townsend & Stockton LLP (57) ABSTRACT

A mobile electronic device stand has at least two interconnected elements, each element being elongated in form along a longitudinal axis. The interconnection includes at least a pair of adjacent interfacing end surfaces connected so as to be rotatable about an axis between the end surfaces from an iconic elongated configuration of the stand to a folded configuration of the stand. In the folded configuration of the stand, the elements are fixable in a setting position to resist rotation with respect to a support surface when the stand is functionally attached to a mobile electronic device and disposed in a manner to support the mobile electronic device in a selected orientation with respect to the support surface.

25 Claims, 4 Drawing Sheets

(51) Int. Cl.
  B65D 19/00 (2006.01)
  F16M 13/00 (2006.01)
  F16M 11/10 (2006.01)
  H04M 1/04 (2006.01)
  G06F 1/16 (2006.01)
  *F16M 11/38* (2006.01)
  *A45D 19/04* (2006.01)
  *A47J 47/16* (2006.01)
  *F16M 11/00* (2006.01)
  *F16D 1/12* (2006.01)
  *A47B 23/04* (2006.01)
  *F16M 11/20* (2006.01)
  *G03B 17/56* (2006.01)
  *F16M 11/22* (2006.01)

(52) U.S. Cl.
  CPC ............ *G06F 1/1632* (2013.01); *H04M 1/04* (2013.01); *A47B 23/042* (2013.01); *A47B 23/043* (2013.01); *A47B 23/044* (2013.01); *F16M 11/00* (2013.01); *F16M 11/2007* (2013.01); *F16M 11/2042* (2013.01); *F16M 11/22* (2013.01); *F16M 2200/066* (2013.01); *F16M 2200/08* (2013.01); *G03B 17/561* (2013.01); *G03B 17/568* (2013.01)

(58) Field of Classification Search
  CPC ........ F16M 11/38; F16M 13/00; F16M 11/10; A47B 23/042; A47B 23/043; A47B 23/044; A47B 2023/042; A63F 9/088; A63F 9/0826; H04M 1/04; G03B 17/561; G03B 17/568
  USPC ...... 403/53; 248/168, 346.01, 346.03, 346.5, 248/370, 371, 397, 688
  See application file for complete search history.

(56) References Cited

U.S. PATENT DOCUMENTS

| | | | | |
|---|---|---|---|---|
| 3,868,085 A | * | 2/1975 | Bentley | ............... 248/452 |
| 4,392,323 A | * | 7/1983 | Rubik | ............... 446/487 |
| 4,751,540 A | * | 6/1988 | Jones | ...... F16M 11/00 248/168 |
| 5,497,971 A | * | 3/1996 | Spiro | ............... 248/455 |
| 7,568,668 B2 | * | 8/2009 | Taekema et al. | ......... 248/166 |
| 7,712,719 B2 | * | 5/2010 | Derry et al. | ........... 248/346.06 |
| 7,980,737 B2 | * | 7/2011 | Hu | ............ F16M 13/00 248/176.3 |
| 8,186,639 B2 | * | 5/2012 | Wang | .......... F16M 11/10 248/163.1 |
| 2009/0010637 A1 | * | 1/2009 | DeWitt | .......... F16M 11/14 396/428 |
| 2009/0098339 A1 | * | 4/2009 | Marceau | ............... 428/151 |
| 2009/0221333 A1 | * | 9/2009 | Harvey | ............... 455/575.1 |
| 2011/0170252 A1 | * | 7/2011 | Jones et al. | ............ 361/679.09 |
| 2011/0233078 A1 | | 9/2011 | Monaco et al. | |
| 2011/0293923 A1 | * | 12/2011 | Schmidt et al. | ......... 428/329 |
| 2012/0001045 A1 | * | 1/2012 | Wang | ............... 248/281.11 |
| 2013/0010986 A1 | | 1/2013 | Annacone | |
| 2013/0265702 A1 | | 10/2013 | Merenda | |
| 2014/0099905 A1 | | 4/2014 | Jimenez | |
| 2014/0206238 A1 | | 7/2014 | Yen et al. | |
| 2014/0233783 A1 | | 8/2014 | Chardon et al. | |

OTHER PUBLICATIONS

Intel Corporation, High Definition Audio Specification, Specification, Jun. 17, 2010, rev. 1.0a.
Microsoft Corporation, Universal Architecture (UAA) High Definition Audio class driver version 1.0a, Microsoft Knowledge Base Artide 888111, Sep. 11, 2011, rev. 8.0.
The FreeBSD Project, snd_hda—Intel High Definition Audiobridge, device driver, Internet Citation, Jan. 25, 2012.
openbsd.org, Azalia—generic High Definition Audio device, Internet Citation, Mar. 15, 2012.
Real Tek Semiconductor Corp., ALC888 Product Page, Internet Citation, 2009.
Conexant, PC HD-Audio, catalog, 2012.
Intel Corporation, Front Panel I/O Connectivity Design Guide, Specification. Feb. 2005, p. 19-25, rev. 1.3.
Intel Corporation, Intel (R) High Definition Audio, Internet Citation, downloaded Feb. 5, 2014.
Intel Corporation, Front panel audio header pinouts, Internet Citation, downloaded Feb. 5, 2014.
Intel Corporation, Motherboard Layout Guidelines for Optimal Audio Fidelity, Internet Citation, downloaded Feb. 5, 2014.
Non-Final Office Action, dated Jul. 8, 2015, for U.S. Appl. No. 14/043,874, filed Oct. 2, 2013, 21 pages.
Chinese First Office Action dated Dec. 25, 2015 for CN Application No. 201310351744.3, with English Translation, 4 pages.
Notice of Allowance, dated Jan. 8, 2016, for U.S. Appl. No. 14/043,874, filed Oct. 2, 2013, 8 pages.

* cited by examiner

FOLDABLE MOBILE ELECTRONIC DEVICE STAND

CROSS REFERENCE TO RELATED APPLICATIONS

This application claims the benefit of Chinese Application Ser No. 201310351744.3, filed Aug. 13, 2013, and U.S. Provisional Application No. 61/765,644, filed on Feb. 15, 2013, the contents of which are incorporated herein by reference thereto.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

This invention relates to accessories for mobile electronic devices including smartphones, tablet computers, cellular phones, personal data assistants, media players, and the like, and more particularly to stands for electronic mobile devices such as tablet computers and mobile phones.

Prior art holders for mobile electronic devices have several drawbacks. First, the connectors used to retain mobile electronic devices often fail to provide support along a complete edge or enough of the edge of the mobile device. As such, the mobile electronic device is prone to rocking and falling over once placed in the holder. Friction connectors are also often used which can result in damage to the front or back surface of the mobile electronic device. These holders generally only provide for a single configuration of the weighted base of the holder, and fail to provide the user with multiple options for configuration of the base of the holder to accommodate differently sized tables or shelves.

What is needed is a stand for a mobile electronic device that overcomes the shortcomings of the art, which has multiple configurations, and/or quick release, non-scratch features for removably retaining a mobile electronic device such as a tablet computer or smart phone.

SUMMARY OF THE INVENTION

The invention provides a mobile electronic device stand that is adaptable to take on at least two configurations. The stand includes at least two interconnected elements. Each element is in an elongated form along a longitudinal axis and has an interconnection. The interconnection includes at least a pair of adjacent interfacing end surfaces adapted so as to be rotatable about an axis in which, in at least one direction of relative rotation, the elements are functionally blocked in a folded configuration against further relative rotation and may rotate with respect to each other in a second direction of relative rotation, to a extended configuration.

In one aspect, the stand includes an interconnection that is a friction connection which resists rotation up until a certain torque input is attained, and then, when this certain torque input is exceeded, the interconnection permits relative rotation of the elements with respect to one another. The interconnection is formed so as to retain the elements together against inadvertent axial disassembly.

In another aspect, the stand includes two adjacent interfacing end surfaces that are adapted so as to enable a folded configuration in which one element includes an interface which supports an edge of a mobile electronic device and another element reacts against a table surface or ground to hold the one element at a suitable angle for viewing the screen of the mobile electronic device.

In yet a further aspect, the stand may be configured to support a mobile electronic device at an angle between zero and 90 degrees.

In yet another variant, the stand includes elongated elements that have external surfaces which, in the extended configuration, smoothly and continuously interface with each other so create a continuum, thereby giving the interconnected elements an appearance of a single monolithic element resembling, for example, a solid of translation.

In yet another variant, the stand includes at least one pair of adjacent interfacing end surfaces that lie in a non-orthogonal plane with respect to an elongated axis of the elements. The non-orthogonal plane is optionally located approximately 45 degrees from the orthogonal plane.

In yet a further variant, the stand includes an elongated edge of the elements that has a lip formed along one edge thereof, so as to catch and retain an edge of a mobile electronic device, and optionally, the elongated edge of the elements is magnetic so as to attract a corresponding ferromagnetic edge of the mobile electronic device.

It is yet another object of the invention to provide a stand that includes at least one pair of adjacent interfacing end surfaces that are biased against each other, and material finish and colors of the elements are selected to be aesthetically pleasing and/or matching the mobile electronic device which rests on the stand. Exemplary elements are provided with a surface resembling brushed metal and/or elements are provided with a dust and finger print resistant surface.

It is yet a further aspect of the invention to provide a stand in which the surface hardness of the elements is less than that of the mobile electronic device against which the stand interfaces, in which, in one application, the stand is styled to match that of an "iPAD™" brand tablet computer from Apple, Inc., and/or in which the elements have a bulbous cross-section in order to provide a user with an improved grip.

In yet another aspect, the extended configuration of the stand is suitable for supporting one edge of a mobile electronic device, for improved viewing as compared to laying flatly on a table surface, and the stand includes an element that has a securing device for securing the stand to the mobile electronic device. The securing device may be a portion of a "VELCROW" strip which interfaces with a corresponding strip on the stand or the mobile electronic device, as the case may be. In another variant, the securing device is a magnetic strip, which interfaces with a ferromagnetic surface of the stand or the mobile electronic device, as the case may be.

In yet another aspect, the stand includes three elements that are interconnected, and the pair of adjacent interfacing end surfaces are adapted so as to enable a folded configuration in which one element supports a back portion of a mobile electronic device, and another element supports a front edge portion of the mobile electronic device and a third element reacts against the table or ground to hold the one element at a suitable angle for viewing the screen of the mobile electronic device.

In yet another variant, the invention provides a mobile communications device stand having a bottom portion which rests on a substantially horizontal surface. The stand includes at least three rotatable, interconnected elements, such that the interconnected elements are capable of being configured into a folded position and an unfolded position. The folded position supports the mobile communications device through multiple angles of inclination of the mobile communications device with respect to the surface on which a bottom portion of the stand rests, and the unfolded position supports a single angle of inclination of the mobile communications device with respect to the surface on which the bottom portion of the stand rests.

In another variant, the stand includes at least two pivot assemblies, and each of the pivot assemblies rotatably connect two respective interconnected elements, and optionally provide for a mechanical stop after a predetermined increment of rotation. The mechanical stop can include releasably interlocking mating members.

In yet a further variant, the invention includes a method of removably disposing a mobile communications device using the stand of the invention. The unitary stand has a bottom portion which rests on a substantially horizontal surface, and the unitary stand is transformable into a folded configuration and an unfolded configuration. In the folded configuration, that stand supports the mobile communications device through multiple angles of inclination of the mobile communications device with respect to the surface on which a bottom portion of the stand rests, and, in the unfolded position, the stand supports a single angle of inclination of the mobile communications device with respect to the surface on which the bottom portion of the stand rests.

In yet another aspect, the invention includes a stand that has a retaining lip against which the front and/or a bottom edge of the mobile communication device rests.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

The stands 100, 300 of the present invention are adjustable in three dimensions to display, showcase, shelf and/or carry a tablet computer or other electronic device, e.g. mobile telecommunications devices, mobile music devices, etc. Stands 100, 300 are substantially linear when they are in a closed configuration. Stands 100, 300 are configured to open up into a substantially pyramidal or quasi-pyramidal shape having a triangular base, and are aesthetically designed to provide a style conforming to the electronic devices they are designed to hold. Various materials are used to construct stands 100, 300 and can include metals, e.g. aluminum, stainless steel, polymeric materials or natural materials, and can include veneers, coatings or suitable metal finishes. It is possible to open or close stands 100, 300 in a single two handed motion by a user. It is appreciated that the stands 100, 300 are transformable into different shapes based upon a user's mobile electronic device 200 screen viewing preferences.

Figure 1:
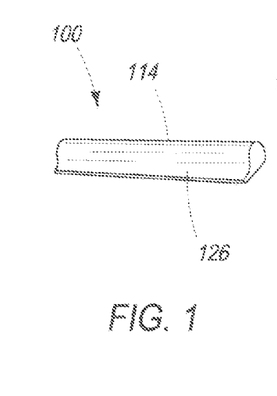
FIG. 1 is a front perspective view of a mobile electronic device stand of the invention.
Figure 2:
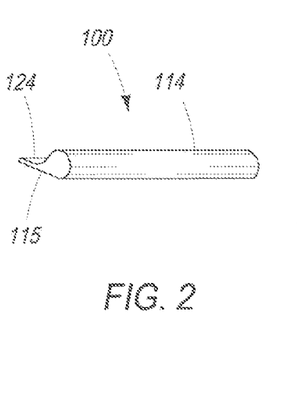
FIG. 2 is a rear perspective view of a mobile electronic device stand of the invention.
Figure 3:
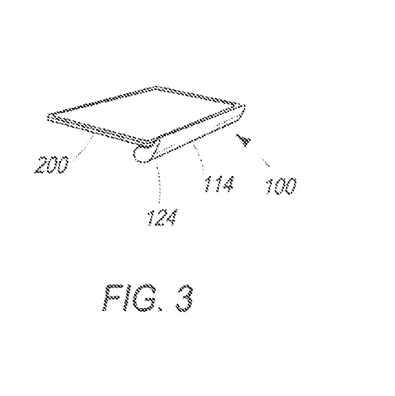
FIG. 3 is a top side perspective view of a mobile electronic device stand of the invention used with a tablet computer.
Figure 4:
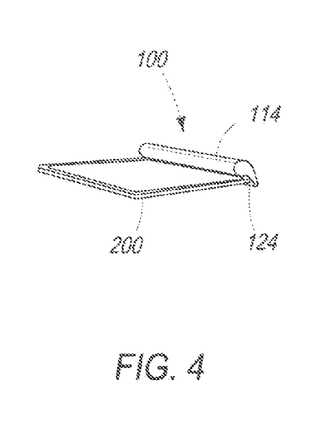
FIG. 4 is a bottom side perspective view of a mobile electronic device stand of the invention used with a tablet computer.
Figures 5, 6:
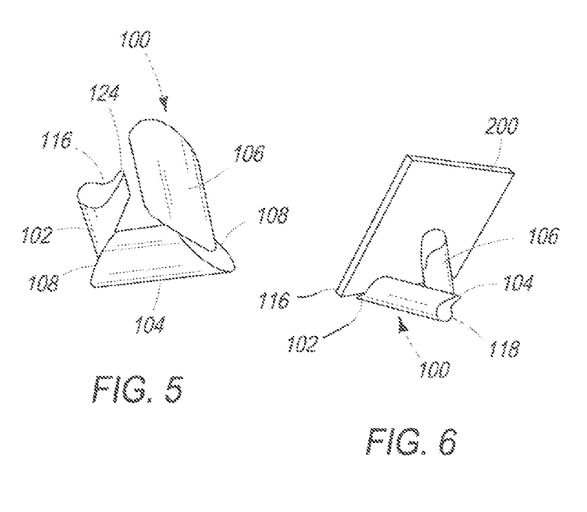
FIG. 5 is a perspective view of a mobile electronic device stand of the invention in a folded configuration.
FIG. 6 is a perspective view of a mobile electronic device stand in a folded configuration used with a tablet computer.
Figure 7:
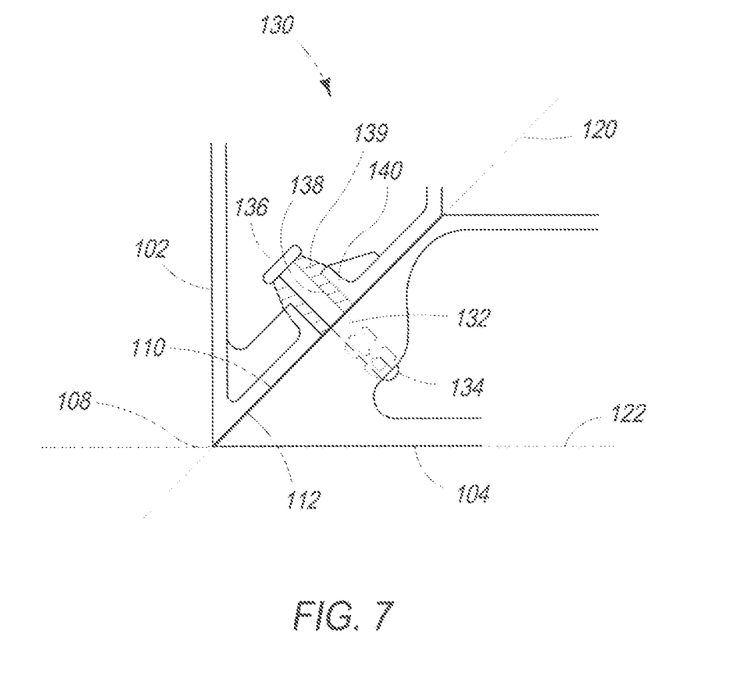
FIG. 7 is a top partially cross-sectioned view of a pivot assembly used in the present invention.

As illustrated in FIGS. 1-15E, a mobile electronic device stand 100 is described herein for mobile electronic device 200 (FIGS. 3, 4 and 6). The mobile electronic device stand 100 is adaptable to take on at least two configurations. The two configurations include a linear configuration (FIGS. 1-4, 9-12 and 15A) and a folded configuration (FIGS. 5, 6, 13, 14 and 15B to 15E). The stand 100 includes at least two interconnected elements 102, 104, and optionally element 106 (FIGS. 5, 6, and 7). Each element 102, 104, 106 is elongated in form along a longitudinal axis wherein the interconnection(s) 108 (FIGS. 5 and 7) include at least a pair of adjacent interfacing end surfaces 110, 112 (FIG. 7) adapted so as to be rotatable about an axis and fixable in a setting position to resist rotation sufficiently to functionally support a tablet computer. In one configuration, the elements are functionally blocked in a folded configuration (FIGS. 1-6) against further relative rotation (at least up to a given torque input) but may rotate more freely with respect to each other in a second direction of relative rotation, to an extended, linear configuration 114 (as shown in FIGS. 1-4).

In one variant, the interconnection is a friction connection which resists rotation up until a certain torque input is attained, and then, when this certain torque input is exceeded, the interconnection permits relative rotation of the elements with respect to one another.

In another variant of the invention, the two adjacent interfacing end surfaces 110, 112 are adapted so as to enable a folded configuration (FIGS. 5-6) in which one element 102 includes an interface 116 (FIG. 5) which supports an edge of a mobile electronic device 116 (FIG. 6) and another element 104 which reacts against a table surface 118 (FIG. 6) or ground to hold the one element 106 (FIG. 6) at a suitable angle for viewing the screen of the mobile electronic device 200. It is appreciated that the stand 100 may be configured to support a mobile electronic device 200 at an angle between zero and 90 degrees.

As shown in FIGS. 1-4, the elongated elements 102, 104 and 106 have external surfaces which, in the extended configuration 114, smoothly and continuously interface with each other so create a continuum, thereby giving the interconnected elements 102, 104, 106 an appearance of a single monolithic, linear element resembling, for example, a solid of translation.

In one variant of the invention and as illustrated in FIG. 7, at least one pair of adjacent interfacing end surfaces 110, 112 lie in a preferably non-orthogonal plane 120 with respect to an elongated axis 122 of the elements 102, 104. In another variant, the (preferably) non-orthogonal plane 120 is located between 30 degrees and 60 degrees from the orthogonal plane 122. In another variant, the non-orthogonal plane 120 is located 45 degrees from the orthogonal plane 122.

As illustrated in FIGS. 2-5, an elongated edge of the elements 102, 104, and 106 have a trailing edge or lip 124 formed along one edge thereof, so as to catch and retain an edge of a mobile electronic device 200. An elongated edge 126 (FIG. 1) of the elements 102, 104, 106 is magnetic so as to attract a corresponding ferromagnetic edge 116 of the mobile electronic device 200 in one embodiment. The interconnection(s) 108 are formed so as to retain the elements 102, 104 (and elements 104, 106) together against inadvertent axial disassembly as illustrated in FIG. 7. As further illustrated in the variant of the invention in FIG. 7, at least one pair of adjacent interfacing end surfaces 110, 112 are biased against each other. The material finish and colors of the elements 102, 104, 106 are selected to be aesthetically pleasing. By way of example, elements 102, 104, 106 are provided with a surface resembling brushed metal, and/or are provided with a dust and finger print resistant surface. In a further variant, the surface hardness of the elements 102, 104, 106 is less than that of the mobile electronic device 200 against which the stand 100 interfaces. Optionally, stand 100 is styled to match that of an "iPAD" from Apple, Inc., and is sized and dimensioned to accommodate this exemplary tablet computer in a tailored manner. As illustrated in FIGS. 1-6, the elements 102, 104, 106 are profiled to a bulbous form in order to provide a user with an improved grip. In further variants, one or more of the surfaces of the stand that contact a table or other surface are coated with a material to provide additional friction so that the stand and tablet computer combination do not unintentionally slide from a desired position. In another variant of the invention, the extended configuration as shown in FIGS. 1-4, 9-12 and 15A is suitable for supporting one edge 116 of a mobile electronic device 200, for improved viewing as compared to laying flatly on a table surface. In yet another variant of the invention, one or more element 102, 104, 106 have a securing device (not shown) for securing the stand 100 to an edge of the mobile electronic device 200. By way of example, the securing device may be a portion of the "VELCROW" strip which interfaces with a corresponding strip on the stand or the mobile electronic device, as the case may be. Alternatively, the securing device is a magnetic strip, which interfaces with a ferromagnetic surface of the mobile electronic device.

As is shown in FIGS. 5 and 6, the stand 100 includes three elements 102, 104, 106 that are interconnected. The pair of adjacent interfacing end surfaces 110, 112 are adapted so as to enable a folded configuration (FIGS. 5 and 6) in which one element 106 supports a back portion of a mobile electronic device 200, another element 102 supports a front edge 116 portion of the mobile electronic device 200 and a third element 104 reacts against the table 118 or ground to hold the one element 106 at a suitable angle far viewing the screen of the mobile electronic device 200.

Figure 8:
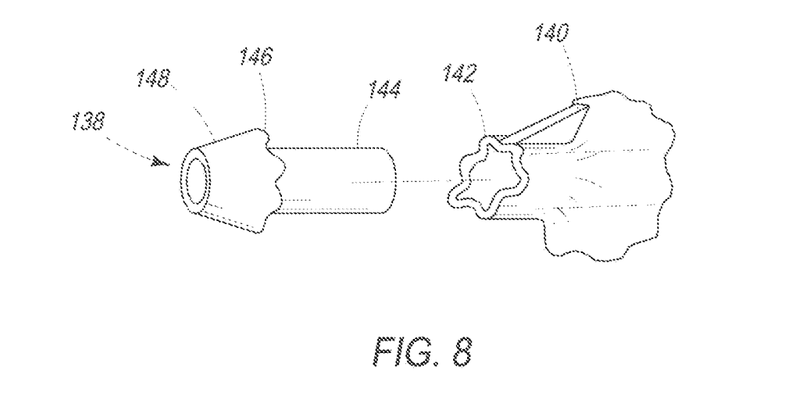
FIG. 8 is a perspective view of a partial, unassembled pivot assembly of FIG. 7 showing the undulated interfacing surfaces thereof.
Figure 9:
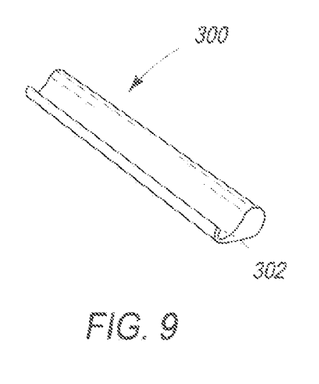
FIG. 9 is a front perspective view of a mobile electronic device stand of the invention with a retaining lip.
Figure 10:
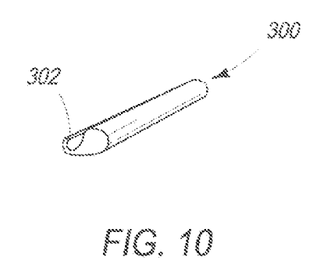
FIG. 10 is a rear perspective view of a mobile electronic device stand of the invention with a retaining lip.
Figure 11:
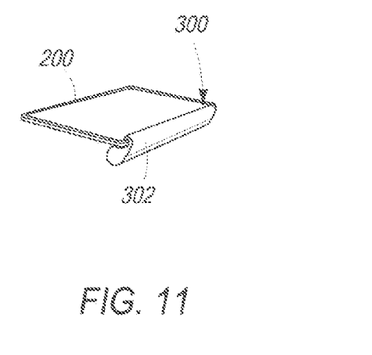
FIG. 11 is a top side perspective view of a mobile electronic device stand with a retaining lip of the invention used with a tablet computer, in which the screen of the tablet computer is visible in an unfolded configuration.
Figure 12:
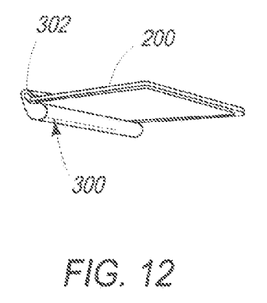
FIG. 12 is a bottom side perspective view of a mobile electronic device stand with a retaining lip of the invention used with a tablet computer, in which the back of the tablet computer is visible in an unfolded configuration.
Figures 13, 14:
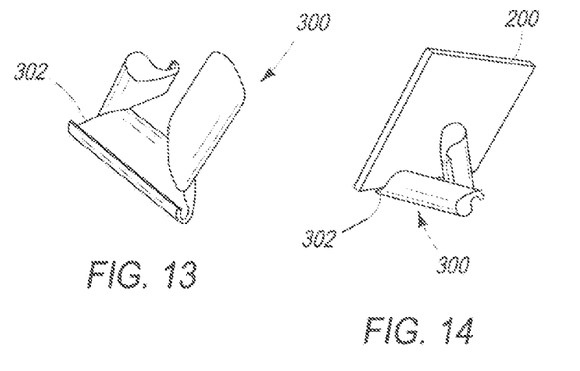
FIG. 13 is a perspective view of a mobile electronic device stand with a retaining lip of the invention in a folded configuration.
FIG. 14 is a perspective view of a mobile electronic device stand with a retaining lip in a folded configuration used with a tablet computer.

FIG. 7 illustrates an exemplary pivot assembly 130 which interconnects elements 102, 104, and elements 104, 106, respectively. Pivot assembly 130 includes a stud 132 (which may be a stainless steel or aluminium stud or pin on one embodiment which is pressed into the end of element 104 which is an injection molded frame component at region 134, and includes a bulbous tip or flange 136. Element 102 (and other adjacent elements, by way of example) includes a receiving member 140 that has a bore 135. Within the bore 135 is a member 138 which is composed of elastomeric material in which stud 132 rotatably sits. Stud 132 is sized and dimensioned to pass through the bore 135 and tightly fit in the receiving member 140. In a variant, the stud 132 rotatably sits in receiving member 140. As illustrated in FIG. 8, receiving member 140 includes an undulating mating surface 142 which is sized and dimensioned to mate with undulating mating surface 146 of member 138. In this variant, it is appreciated that member 138 is fixedly connected to stud 132 with epoxy 139, and member 138 rotates within the bore 135 in conjunction with pin 132. It is appreciated that this variant of the pivot assembly permits for rotation and releasably locking in place of one member 102, in relation to another member 104, and member 104 in relation 106. This permits a user to widely adjust the angular inclination of the mobile electronic device 200 with respect to the stand 100 and also the table 118 to provide the most desired viewing inclination.

While exemplary pivot assembly 130 is illustrated, it is appreciated that other types of pivot assemblies may also be used in the invention, which may include pin and biased spring assemblies that permit rotation of the members 102, 104 with respect to each other and the like. For example, bi- or uni-directional ratchet interface can be used to allow repositioning of the components relative to one another. The teeth of these ratchet-like interfaces can be visible in the interface between two adjacent members 102, 104, 106, or invisible, formed on the interfacing surfaces themselves. The interfaces may be urged together with an expansion spring which draws the two adjacent members together, or may include springs and corresponding spring detents which allow relative repositioning or folding of adjacent elements, with a detent position at any suitable interval about the axis of rotation. In the most rudimentary interconnection, a friction hinge known in the art to interconnect a laptop screen and a laptop keyboard may be used. Many such means of joining the adjacent elements are known in the art and readily apparent to the person of ordinary skill in the art.

It is appreciated that the invention provides mobile communications device stand 100 that has a bottom portion which rests on a surface 118. The stand includes at least three rotatable, interconnected elements 102, 104, 106. The interconnected elements 102, 104, 106 are capable of being configured into a folded position (FIGS. 5 and 6) and an unfolded position (FIGS. 1-4). The folded position supports the mobile communications device 200 through multiple angles of inclination of the mobile communications device 200 with respect to surface 118 on which a bottom portion of the stand 100 rests, and the unfolded position supports a single angle of inclination of the mobile communications device 200 with respect to the surface on which the bottom portion of the stand 100 rests. The stand also includes two or more pivot assemblies 130. The pivot assemblies rotatably connect two respective interconnected elements, 102 and 104, and 104 and 106 and provide for a mechanical stop (key location or point of low potential energy) after a predetermined increment of angular rotation. The mechanical stop includes releasably interlocking mating members as illustrated by the mechanism in FIG. 8.

It is also appreciated that the invention also provides a method of removably disposing a mobile communications device on a surface with a unitary stand. The unitary stand has a bottom portion which rests on a substantially horizontal surface, and the unitary stand can be twisted or transformed into a folded, twisted configuration and an unfolded linear configuration. The method includes, in the folded configuration, supporting the mobile communications device through multiple angles of inclination of the mobile communications device with respect to the surface on which a bottom portion of the stand rests, and, in the unfolded position, supporting a single angle of inclination of the mobile communications device with respect to the surface on which the bottom portion of the stand rests. This permits a user to have multiple viewing angle options for the mobile communications device, such as when they are viewing the device on their desk versus viewing the device while reclining in bed.

FIGS. 9-14 illustrate stand 300, in unfolded configurations (FIGS. 9-12) and folded configurations (FIGS. 13-14) which is a variant of stand 100 incorporating one or more features described above of stand 100. Stand 300 incorporates a retaining lip 302 for removably holding the edge of mobile electronic device 200. Lip 302 is substantially curved in one embodiment. In another embodiment lip 302 is sized and dimensioned to accommodate and to conform to the contours of the edge of mobile electronic device 200 so that the mobile electronic device 200 tightly fits into the channel formed by retaining lip 302 and the remaining portion of stand 300. In yet another variant, the lip 302 is made from flexible material and is biased inward toward the body of stand 300, to removably grip mobile electronic device 200.

In another embodiment, note that, with the variation having three interconnecting elements, the geometric relation between the interfaces between the interconnected elements, may be one in which the axis of rotation of one interface lies in a substantially horizontal plane and the axis of rotation of the other lies in a substantially vertical plane, such that the planes in which the axes may be located are approximately orthogonal. It should be appreciated though that an acceptable variation from a perfect 90 degree orthogonal relative orientation of the planes can be as high as 45 degrees, in order to attain a folded orientation that suits the particular need at hand. In one embodiment, the variation from an orthogonal orientation of the planes is 30 degrees.

In an embodiment shown in all figures except FIGS. 15A to 15E, the stand has a flat base surface 115 suitable for resting against the support surface 118. In this embodiment, one interface is disposed on substantially flat surfaces on a plane inclined toward the center of the stand, on a 45 degree plane to the base surface 115, and which plane and base surface 115 intersect along a line perpendicular to the longitudinal axis of the stand 100. The other interface is oriented orthogonal to this base surface 115 but rotated 45 degrees from the longitudinal axis of the stand 100. The result is a view along the trailing edge 124 of the stand 100 in which the interfaces appear inclined toward one another at a 45 degree angle and a view from the opposite side of the stand in which only one of the interfaces appears inclined at 45 degrees whereas the other interface shows no discernible inclination (due to the form of the intersection cut by the interface).

Referring in particular to FIGS. 3, 4, 11 and 12, the solid of translation version, of the prototype, is designed to provide a better grip for a tablet computer without increasing its width or length—only it's depth on one edge is increased, which provides the user with a feeling of a more secure grip.

Exemplary mobile electronic devices 200 that are used herein include an "Apple"™ "iPad"™ mobile electronic device, and, of course the invention can be used with other mobile electronic devices and tablet-like devices. This mobile electronic device has a touch-responsive display surrounded by a frame. Lip 302 is sized and dimensioned not to obstruct control or home buttons on the frame of the tablet computer in one variant. In another variant, lip 302 is sized and dimensioned to obstruct these buttons.

Figure 15A:
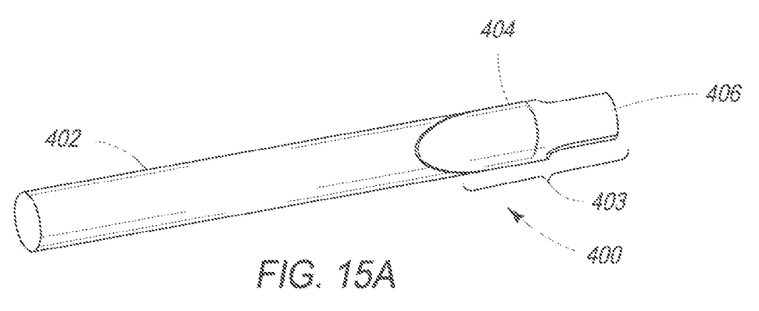
FIG. 15A is a perspective view of an alternate mobile electronic device stand of the invention, in an extended, monolithic configuration.

Referring now to FIG. 15A, an alternate embodiment of the mobile electronic device stand 400 of the invention has at least two elements 402 and 403. The stand 400 is in an extended, monolithic configuration in which the cross section is essentially cylindrical. The element 403 may optionally be made up of two elements 404 and 406, which pivot relative to one another so as to allow an adjustment by the user of the inclination of the mobile electronic device 200 held by the stand 400. The interface between the elements 402, 403 or 402 and 404 as well as between 404 and 406 is formed in any number of ways, already described herein, which provide a fixing of the elements by twisting of the same relative to another, to provide various configurations to suit the needs of the user.

Figure 15B:
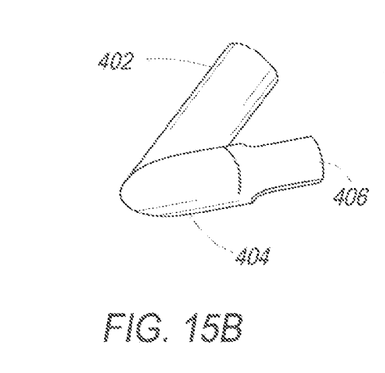
FIG. 15B is a first perspective view of an alternate mobile electronic device stand of the invention, in a folded configuration.
Figure 15C:
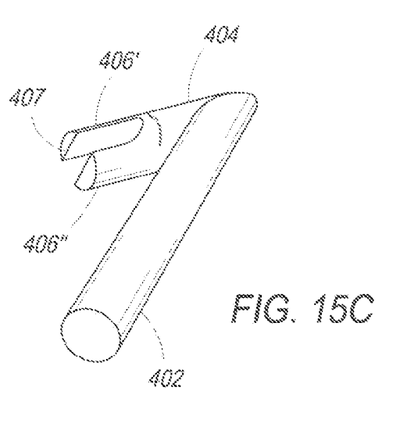
FIG. 15C is a second perspective view of an alternate mobile electronic device stand of the invention, in a folded configuration.

Referring now to FIGS. 15B and 15C, the stand 400 is folded at the interface between elements 402, 403 or 402 and 404, to provide a support arm which extends to support the mobile electronic device 200 which may be inserted between forks 406' and 406". Optionally, a soft protective surface 407 may be provided between the forks 406' and 406" to prevent damage to the mobile electronic device when installed therebetween.

Figure 15D:
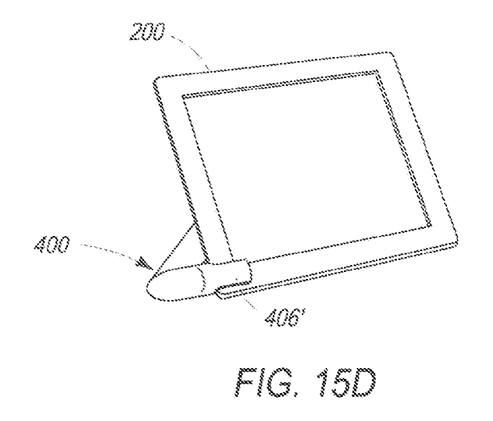
FIG. 15D is a first perspective view of an alternate mobile electronic device stand of the invention, holding a mobile electronic device.
Figure 15E:
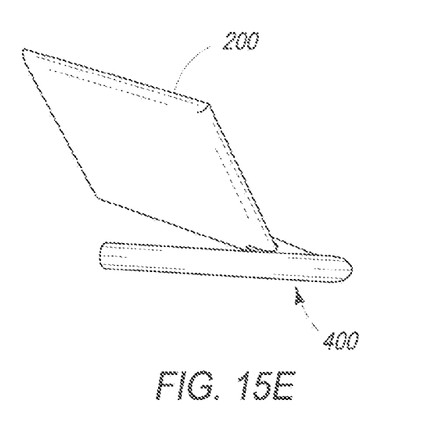
FIG. 15E is a second perspective view of an alternate mobile electronic device stand of the invention, holding a mobile electronic device.

Referring now to FIGS. 15D and 15E, the alternate mobile electronic device stand 400 of the invention is shown holding the mobile electronic device 200 between the forks 406' and 406". As is evident, this alternate stand 400 may be made up of only two elements, where the inclination of the mobile electronic device 200 may be pre-set.

It should be appreciated that the particular implementations shown and herein described are representative of the invention and its best mode and are not intended to limit the scope of the present invention in any way.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims. As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements described in the instant specification. Unless otherwise explicitly stated, the use of the term "consisting" or "consisting of" or "consisting essentially or is not intended to limit the scope of" the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention. The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein.

Additional features and functionality of the invention are described in the claims appended hereto. Such claims are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. A stand for a mobile electronic device comprising:
at least two interconnected elements joined by an interconnection, each element being elongated in form along a longitudinal axis to form an iconic elongated configuration with a linear shape;
wherein the interconnection includes at least a pair of adjacent interfacing end surfaces connected so as to be rotatable from the iconic elongated configuration of the stand to a folded configuration of the stand in which the elements are fixable in a setting position to resist rotation with respect to a support surface when the stand is functionally attached to the mobile electronic device and disposed in a manner to support the mobile electronic device in an selected orientation with respect to the support surface;
wherein the end surfaces are adjacent each other and lie in a first plane which is non-orthogonal with respect to the longitudinal axis of the two interconnected elements and a second plane parallel to the support surface;
a support element connected to one of the interconnected elements, for supporting the mobile electronic device in the folded configuration, the support element comprising
an interface proximate an end of a first of the interconnected elements which supports an edge of a mobile electronic device and
a second of the interconnected elements having a part that engages a back surface of the mobile electronic device in the folded configuration at an angle between 0 and 90 degrees for viewing the screen of the mobile electronic device, such that the stand reacts against a support surface in order to hold the mobile electronic device.

2. The stand of claim 1, wherein the interconnection is a friction connection which resists rotation up until a certain torque input is attained, and then, when this certain torque input is exceeded, the interconnection permits relative rotation of the elements with respect to one another.

3. The stand of claim 2, wherein the interconnected elements each include a lip, with the lips being continuous in the unfolded position to support the mobile electronic device in the unfolded configuration.

4. The stand of claim 3, wherein the stand may be configured to support a mobile electronic device at an angle between zero and 90 degrees.

5. The stand of claim 1, wherein the elongated elements have external surfaces which, in the elongated configuration, smoothly and continuously interface with each other so create a continuum, thereby giving the interconnected elements an appearance of a single monolithic element.

6. The stand of claim 1, wherein the first plane is located between 30 degrees and 60 degrees from the orthogonal second plane.

7. The stand of claim 1, wherein the first plane is located 45 degrees from the second plane.

8. The stand of claim 1, wherein the support element comprises a magnet along an elongated edge of at least one of the interconnected elements so as to attract a corresponding ferromagnetic edge of the mobile electronic device.

9. The stand of claim 8, wherein, when the stand is in its elongated configuration, it attaches along a single edge of a mobile electronic device so as to improve a grip between the user and the mobile electronic device without increasing the width or length envelope of the combination.

10. The stand of claim 1, wherein the interconnection is formed so as to retain the elements together against inadvertent axial disassembly.

11. The stand of claim 10, wherein at least one pair of adjacent interfacing end surfaces are biased against each other.

12. The stand of claim 1, wherein the elements are provided with a surface resembling brushed metal.

13. The stand of claim 1, wherein the elements are provided with a dust and/or finger print resistant surface.

14. The stand of claim 1, wherein the surface hardness of the elements is less than that of the mobile electronic device against which the stand interfaces.

15. The stand of claim 1, wherein the elements are profiled to a bulbous form in order to provide a user with an improved grip.

16. The stand of claim 1, wherein the elongated configuration elevates and supports one edge of a mobile electronic device, for improved viewing as compared to laying flatly on a horizontal surface.

17. The stand of claim 1, wherein an element has a securing device for securing the stand on a support structure in the folded configuration.

18. The stand of claim 17, wherein the securing device is located on at least one element.

19. The stand of claim 18, wherein the securing device is a portion of the "VELCRO" strip which interfaces with a corresponding strip on a mobile electronic device.

20. The stand of claim 18, wherein the securing device is a magnetic strip, which interfaces with a ferromagnetic surface of a mobile electronic device.

21. The stand of claim 1, wherein three elements are interconnected.

22. A stand for a mobile electronic device comprising:
at least three rotatable, interconnected elements, the interconnected elements capable of being configured into a folded position and an unfolded position, the folded position being capable of supporting the mobile electronic device through multiple angles of inclination of the mobile electronic device with respect to a surface on which a bottom portion of the stand rests, and the unfolded position supporting a single angle of inclination of the mobile electronic device with respect to the surface on which the bottom portion of the stand rests, wherein the interconnected elements each include a lip, with the lips being continuous in the unfolded position to support the mobile electronic device; and
a securing device connected to at least one of the three interconnected elements, for supporting the mobile electronic device at an angle, the securing device comprising
an interface proximate an end of a first of the interconnected elements which supports an edge of a mobile electronic device and
a second of the interconnected elements having a part that engages a back surface of the mobile electronic device at an angle between 0 and 90 degrees for viewing the screen of the mobile electronic device, such that the stand reacts against a support surface in order to hold the mobile electronic device.

23. The stand of claim 22 further comprising two pivot assemblies, each of said pivot assemblies rotatably connecting two respective interconnected elements, and providing for a mechanical stop after a predetermined angle of rotation.

24. The stand of claim 23 in which the mechanical stop comprises releasably interlocking mating members.

25. The stand of claim 1, wherein a flat base surface is formed on the stand, such base surface being adapted to rest against a support surface, and wherein one interface is disposed along a substantially flat surface along a plane inclined toward the center of the stand, along an approximately 45 degree plane to the base surface, and which plane and base surface intersect along a line perpendicular to the longitudinal axis of the stand and another interface is oriented orthogonal to the base surface but rotated 45 degrees from the longitudinal axis of the stand.

* * * * *